US012651767B2

(12) United States Patent
Li et al.

(10) Patent No.: US 12,651,767 B2
(45) Date of Patent: Jun. 9, 2026

(54) LITHIUM-ION BATTERY

(71) Applicant: SVOLT ENERGY TECHNOLOGY CO., LTD., Jiangsu (CN)

(72) Inventors: Minglu Li, Jiangsu (CN); Hongxin Yang, Jiangsu (CN); Fei Gao, Jiangsu (CN); Jing Liu, Jiangsu (CN)

(73) Assignee: Svolt Energy Technology Co., Ltd., Jiangsu (CN)

( * ) Notice: Subject to any disclaimer, the term of this patent is extended or adjusted under 35 U.S.C. 154(b) by 539 days.

(21) Appl. No.: 18/039,029

(22) PCT Filed: Apr. 13, 2022

(86) PCT No.: PCT/CN2022/086542
§ 371 (c)(1),
(2) Date: May 26, 2023

(87) PCT Pub. No.: WO2023/108964
PCT Pub. Date: Jun. 22, 2023

(65) Prior Publication Data
US 2024/0356058 A1　　Oct. 24, 2024

(30) Foreign Application Priority Data

Dec. 13, 2021　(CN) .......................... 202111523014.8

(51) Int. Cl.
| | |
|---|---|
| *H01M 10/0525* | (2010.01) |
| *H01M 4/02* | (2006.01) |
| *H01M 4/505* | (2010.01) |
| *H01M 4/525* | (2010.01) |
| *H01M 4/583* | (2010.01) |

(52) U.S. Cl.
CPC ....... *H01M 10/0525* (2013.01); *H01M 4/505* (2013.01); *H01M 4/525* (2013.01); *H01M 4/583* (2013.01); *H01M 2004/021* (2013.01); *H01M 2004/027* (2013.01); *H01M 2004/028* (2013.01)

(58) Field of Classification Search
CPC .. H01M 10/0525; H01M 4/505; H01M 4/525; H01M 4/583; H01M 2004/021; H01M 2004/027; H01M 2004/028
See application file for complete search history.

(56) References Cited

U.S. PATENT DOCUMENTS

| | | | |
|---|---|---|---|
| 2009/0130561 A1* | 5/2009 | Matsumoto | ......... C04B 35/6262 |
| | | | 252/182.1 |
| 2020/0006801 A1 | 1/2020 | Cao | |
| 2020/0006802 A1 | 1/2020 | Xu | |
| 2023/0112637 A1 | 4/2023 | Zhang | |

FOREIGN PATENT DOCUMENTS

| | | | | |
|---|---|---|---|---|
| CN | 108808072 A | | 11/2018 | |
| CN | 108832075 A | | 11/2018 | |
| CN | 104899439 B | * | 5/2019 | |
| CN | 111446488 A | * | 7/2020 | ............. H01M 4/13 |
| CN | 112151796 A | | 12/2020 | |
| CN | 112750976 A | | 5/2021 | |
| JP | 2007042611 A | | 2/2007 | |
| JP | 2013058451 A | * | 3/2013 | |

OTHER PUBLICATIONS

The decision of SIPO to grant a Patent for Application CN 202111523014 (Year: 2024).*
Search Report dated Jul. 30, 2024 for European patent application No. 22893994.8.
First Office Action dated Jun. 29, 2023 for CN patent application No. 202111523014.8.
International Search Report and Written Opinion of the International Searching Authority for PCT Patent application No. PCT/CN2022/086542.
Alipour Mohammad et al:"A Review on Temperature-Dependent Electrochemical Properties, Aging, and Performance of Lithium-Ion Cells",BATTERIES,vol.6, No. 3, Jun. 28, 2020,p. 35.

* cited by examiner

*Primary Examiner* — Alexander Usyatinsky
(74) *Attorney, Agent, or Firm* — Miles & Stockbridge P.C.; Ajay A. Jagtiani

(57) ABSTRACT

The present disclosure provides a lithium-ion battery. The positive electrode plate and the negative electrode plate of the lithium-ion battery meet the following requirements: $0.4 < (\ln Ds)^2 / C_{D50}/(A_{OI})^2 < 18.2$. By regulating the relationship between positive electrode and negative electrode of the lithium-ion battery, the dynamics of the positive and negative electrodes of the lithium-ion battery can achieve optimal matching in the fast charging process, ensure that the lithium-ion battery has a higher charging capacity, while ensuring that the lithium-ion battery has a good cycle life and safety when it is used for long-term fast charging.

5 Claims, No Drawings

LITHIUM-ION BATTERY

CROSS-REFERENCE TO RELATION APPLICATIONS

This application is a National Stage of International Application No. PCT/CN2022/086542 filed on Apr. 13, 2022, which claims priority to Chinese Patent Application No. 202111523014.8, filed on Dec. 13, 2021, which is hereby incorporated by reference in their entirety.

TECHNICAL FIELD

The present disclosure relates to the field of batteries, for example relates to a lithium-ion battery.

BACKGROUND

Lithium-ion batteries have the advantages of high energy density, long cycle life and good safety performance. With the gradual increase of lithium-ion battery market, consumers have higher and higher requirements for the fast charge performance and energy density of lithium-ion battery. Therefore, the development of lithium-ion batteries with high energy density and fast charging ability has always been the direction of research and development personnel's attention.

The performance of lithium-ion battery is closely related to its positive and negative electrode active materials. The selection of high-quality positive and negative electrode active materials has a key influence on ensuring high safety, high charging speed and long-term cycle reliability of lithium-ion battery. The existing technology often achieves a high charging speed by reducing the coating weight and increasing the amount of conductive agent, but these methods often lead to a significant decrease in the energy density of lithium-ion batteries, and the cruising range of lithium-ion batteries is difficult to meet the requirements. If fast charging is forced on lithium-ion batteries that do not have fast charging capability, lithium dendrites can easily grow on the surface of the negative electrode, and the capacity of lithium-ion battery will be seriously lost. In addition, the continuous growth of lithium dendrites may puncture the separator during the use of lithium-ion batteries, which brings safety hazards to lithium-ion batteries. Therefore, how to improve the fast charging performance of lithium-ion batteries while ensuring their good cycling performance and safety performance is an urgent technical problem to be solved.

SUMMARY OF THE INVENTION

The present disclosure provides a lithium-ion battery.

In an embodiment, the present disclosure provides a lithium-ion battery comprising a positive electrode plate, a negative electrode plate, a separator and an electrolyte;

wherein the positive electrode plate and the negative electrode plate meet the following requirements: $0.4 < (\ln Ds)^2/C_{D50}/(A_{OI})^2 < 18.2$, for example, 0.5, 1, 2, 3, 4, 5, 6, 7, 8, 9, 10, 11, 12, 13, 14, 15, 16, 17, 18, or 18.1, etc., wherein Ds is the solid-phase diffusion coefficient of the positive active material in the positive electrode plate, $C_{D50}$ is the average particle size of the positive active material in the positive electrode plate, and $A_{OI}$ is the OI value of the negative active material in the negative electrode plate; and the negative active material in the negative electrode plate comprises graphite.

In an embodiment provided by the present disclosure, the OI value of the negative active material provided is the ratio of the peak area of the 004 characteristic diffraction peak in the X-ray diffraction pattern of the negative electrode plate to the peak area of the 110 characteristic diffraction peak in the X-ray diffraction pattern of the negative electrode plate.

Ds represents the degree of difficulty in the intrinsic ion diffusion of eigen positive electrode material. The larger the ion diffusion coefficient is, the better the power characteristics of the material are, and the easier intercalating and deintercalating lithium ions from the positive electrode material are. When the ionic diffusion coefficient of positive material is determined, the larger the particle size of positive material is, the longer the time required for diffusion will be. Therefore, according to the characteristics of the ion diffusion coefficient of different positive electrode materials, it is necessary to adjust the particle size $C_{D50}$ of the material in order to improve the material ratio characteristics.

The OI value of the negative electrode plate can reflect the degree of stacking orientation of the negative active material particles in the negative electrode plate. During the charging process, lithium ions are deintercalated from the positive active material and intercalated in the negative active material. Therefore, the OI value of the negative electrode plate has a great influence on the charging speed and cycle service life of the lithium-ion battery. If the ion diffusion coefficient of the positive material is large. D50 is small, and the OI value of the negative electrode plate is large, the time required for lithium ions to migrate from the inside of the positive active material particles to the outside is relatively short, and the negative active material particles are preferentially oriented parallel to the negative current collector in the negative electrode diaphragm. At this time the lithium-ion battery is rapidly charged, the rapid deintercalation of lithium ions from the positive active material will not be able to be intercalated in the negative active material, which will lead to the reduction and precipitation of some lithium ions directly on the surface of the negative electrode to form lithium dendrites, resulting in the loss of the lithium-ion battery capacity. In addition, during the cyclic charging and discharging process of lithium-ion batteries, the continuous growth of lithium dendrites will pierce the separator, forming a large safety hazard, and the continuous growth of lithium dendrites also consumes too much lithium ions, and the capacity of lithium-ion batteries will decay too quickly during the cycle use.

Therefore, In an embodiment provided by the present disclosure, by regulating the relationship between Ds and $C_{D50}$ in the positive electrode and $A_{OI}$ in the negative electrode of the lithium-ion battery, the dynamics of the positive and negative electrodes of the lithium-ion battery can achieve optimal matching in the fast charging process, ensure that the lithium-ion battery has a higher charging capacity, while ensuring that the lithium-ion battery has a good cycle life and safety when it is used for long-term fast charging.

In an embodiment, $1.5 < (\ln Ds)^2/C_{D50}/(A_{OI})^2 < 18.2$, such as 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5 or 15, etc.

In an embodiment provided by the present disclosure, when $(\ln Ds)^2/C_{D50}/(A_{OI})^2$ is greater than 1.5, the migration rate and migration distance of lithium ions in the positive electrode active material match the ability of the negative electrode to accept lithium ions, and the lithium-ion battery can maintain excellent charging capacity in the long-term cycle process, thereby improving the cycle life and safety performance of the battery.

In an embodiment, Ds is in a range from $10^{-10}$ cm$^2$/S to $10^{-13}$ cm$^2$/S, such as $1 \times 10^{-10}$ cm$^2$/S, $2 \times 10^{-10}$ cm$^2$/S, $3 \times 10^{-10}$ cm$^2$/S, $4 \times 10^{-10}$ cm$^2$/S, $5 \times 10^{-10}$ cm$^2$/S, $6 \times 10^{-10}$ cm$^2$/S, $7 \times 10^{-10}$ cm$^2$/S, $8 \times 10^{-10}$ cm$^2$/S, $9 \times 10^{-10}$ cm$^2$/S, $9.9 \times 10^{-10}$ cm$^2$/S, $3 \times 10^{-11}$ cm$^2$/S, $4 \times 10^{-11}$ cm$^2$/S, $5 \times 10^{-11}$ cm$^2$/S, $1 \times 10^{-12}$ cm$^2$/S, $2 \times 10^{-12}$ cm$^2$/S, $6 \times 10^{-12}$ cm$^2$/S, $7 \times 10^{-12}$ cm$^2$/S, $8 \times 10^{-12}$ cm$^2$/S, $9 \times 10^{-12}$ cm$^2$/S, $1 \times 10^{-13}$ cm$^2$/S, $2 \times 10^{-13}$ cm$^2$/S, $3 \times 10^{-13}$ cm$^2$/S, $4 \times 10^{-13}$ cm$^2$/S, $5 \times 10^{-13}$ cm$^2$/S, $6 \times 10^{-13}$ cm$^2$/S, $7 \times 10^{-13}$ cm$^2$/S, $8 \times 10^{-13}$ cm$^2$/S, $9 \times 10^{-13}$ cm$^2$/S or $9.9 \times 10^{-13}$ cm$^2$/S, etc.

In an embodiment provided by the present disclosure, if Ds is too small, it is not conducive to the migration of lithium ions in the positive active material, especially at low temperature, the migration rate further decreases, the material dynamics performance is insufficient, and the battery power and low temperature performance become worse. If Ds is too large, on the one hand, it is necessary to increase the proportion of nickel and cobalt precious metals in positive active materials, resulting in increased material design costs and lack of market competitiveness. On the other hand, when Ds is larger, the ion migration rate of positive material is faster, the dynamic performance of positive active material is excellent, and the battery charging ability is better.

In an embodiment, $C_{D50}$ is in a range from 2 μm to 15 μm, such as 2 μm, 3 μm, 4 μm, 5 μm, 6 μm, 7 μm, 8 μm, 9 μm, 10 μm, 11 μm, 12 μm, 13 μm, 14 μm, or 15 μm, etc.

In an embodiment provided by the present disclosure, if $C_{D50}$ is too small, the synthesis cost of the positive material is high and the processing is difficult, and the electrode compacting density is low. However, if $C_{D50}$ is too large, the migration distance of lithium ions in the positive electrode active material will be too long, resulting in a decrease in the power performance of the material and a deterioration charging ability.

In an embodiment, $A_{OI}$ is in a range from 5 to 30, such 5, 6, 7, 8, 9, 10, 11, 12, 13, 14, 15, 16, 17, 18, 19, 20, 21, 22, 23, 24, 25, 26, 27, 28, 29 or 30, etc.

In an embodiment provided by the present disclosure, if $A_{OI}$ value is too small, which will result in poor machining performance of the negative electrode, a decrease in energy density and an increase in the cost of the negative electrode. When the $A_{OI}$ value is too large, the lithium intercalation capacity of the negative electrode decreases, and the charging process leads to the precipitation of lithium ions on the surface of the negative electrode and the formation of lithium dendrites, resulting in the loss of lithium-ion capacity. In addition, the continuous growth of lithium-ion dendrites consumes too much lithium ions, and the capacity of the long-term fast charge cycle rapidly decays, and the battery cycle life decreases.

In an embodiment, the chemical formula of the positive active material in the positive electrode plate is $Li_aNi_xCo_yM_{1-x-y}O_2$, wherein $0.9 \leq a \leq 1.2$, $x > 0$, $y \geq 0$, $z \geq 0$, and $x + y + z = 1$, wherein M comprises any one or a combination of at least two of Mn, Al or W.

For example, the a can be 0.9, 0.95, 1, 1.05, 1.1, 1.15, or 1.2, and the x can be 0.1, 0.2, 0.3, 0.4, 0.5, 0.6, 0.7, 0.8, or 0.9, etc., they can be 0, 0.1, 0.2, 0.3, 0.4, 0.5, 0.6, 0.7, 0.8 or 0.9, and the z can be 0, 0.1, 0.2, 0.3, 0.4, 0.5, 0.6, 0.7, 0.8 or 0.9, etc.

In an embodiment, the positive electrode plate comprises a positive active material, a conductive agent and a binder.

In an embodiment provided by the present disclosure, in the positive electrode plate, the conductive agent includes but not limited to acetylene black, ketjen black, carbon nanotubes or graphene, etc., and the binder includes but not limited to polyvinylidene fluoride or polytetrafluoroethylene, etc.

In an embodiment, the negative electrode plate comprises a negative active material, a conductive agent and a binder.

In an embodiment provided by the present disclosure, in the negative electrode plate, the conductive agent includes but not limited to acetylene black, ketjen black, carbon nanotubes or graphene, etc. and the binder includes but not limited to styrene butadiene rubber, sodium carboxymethyl cellulose or polyacrylic acid, etc.

In an embodiment provided by the present disclosure, the preparation method of the provided positive and negative electrode plates is not defined, which can be obtained by using a conventional homogenization coating method.

In an embodiment provided by the present disclosure, there is no restriction on the source of the provided separator and electrolyte. Exemplarily, it can be a conventional product used in lithium-ion batteries. For example, it may be a product commonly used in lithium-ion batteries, for example, the separator comprises any one or a combination of at least two of the woven membrane, non-woven fabric, microporous membrane, composite membrane, diaphragm paper or laminated membrane.

In an embodiment, the lithium-ion battery is a lithium-ion power battery.

Exemplarily, the preparation method of lithium-ion batteries provided in the present disclosure includes but not limited to the winding method and the stacking method, that is, the preparation method of the conventional lithium-ion battery, and both of which are applicable to the present disclosure.

DETAILED DESCRIPTION

In an embodiment, the present disclosure provides a lithium-ion battery comprising a positive electrode plate, a negative electrode plate, a separator and an electrolyte;

wherein the positive electrode plate and the negative electrode plate meet the following requirements: $0.4 < (\ln Ds)^2/C_{D50}/(A_{OI})^2 < 18.2$, for example, 0.5, 1, 2, 3, 4, 5, 6, 7, 8, 9, 10, 11, 12, 13, 14, 15, 16, 17, 18, or 18.1, etc., wherein Ds is the solid-phase diffusion coefficient of the positive active material in the positive electrode plate, $C_{D50}$ is the average particle size of the positive active material in the positive electrode plate, and $A_{OI}$ is the OI value of the negative active material in the negative electrode plate; and the negative active material in the negative electrode plate comprises graphite.

In an embodiment provided by the present disclosure, the OI value of the negative active material provided is the ratio of the peak area of the 004 characteristic diffraction peak in the X-ray diffraction pattern of the negative electrode plate to the peak area of the 110 characteristic diffraction peak in the X-ray diffraction pattern of the negative electrode plate.

Ds represents the degree of difficulty in the intrinsic ion diffusion of eigen positive electrode material. The larger the ion diffusion coefficient is, the better the power characteristics of the material are, and the easier intercalating and deintercalating lithium ions from the positive electrode material are. When the ionic diffusion coefficient of positive material is determined, the larger the particle size of positive material is, the longer the time required for diffusion will be. Therefore, according to the characteristics of the ion diffusion coefficient of different positive electrode materials, it is necessary to adjust the particle size $C_{D50}$ of the material in order to improve the material ratio characteristics.

The OI value of the negative electrode plate can reflect the degree of stacking orientation of the negative active material particles in the negative electrode plate. During the charging process, lithium ions are deintercalated from the positive active material and intercalated in the negative active material. Therefore, the OI value of the negative electrode plate has a great influence on the charging speed and cycle service life of the lithium-ion battery. If the ion diffusion coefficient of the positive material is large, D50 is small, and the OI value of the negative electrode plate is large, the time required for lithium ions to migrate from the inside of the positive active material particles to the outside is relatively short, and the negative active material particles are preferentially oriented parallel to the negative current collector in the negative electrode diaphragm. At this time the lithium-ion battery is rapidly charged, the rapid deintercalation of lithium ions from the positive active material will not be able to be intercalated in the negative active material, which will lead to the reduction and precipitation of some lithium ions directly on the surface of the negative electrode to form lithium dendrites, resulting in the loss of the lithium-ion battery capacity. In addition, during the cyclic charging and discharging process of lithium-ion batteries, the continuous growth of lithium dendrites will pierce the separator, forming a large safety hazard, and the continuous growth of lithium dendrites also consumes too much lithium ions, and the capacity of lithium-ion batteries will decay too quickly during the cycle use.

Therefore, In an embodiment provided by the present disclosure, by regulating the relationship between Ds and $C_{D50}$ in the positive electrode and $A_{OI}$ in the negative electrode of the lithium-ion battery, the dynamics of the positive and negative electrodes of the lithium-ion battery can achieve optimal matching in the fast charging process, ensure that the lithium-ion battery has a higher charging capacity, while ensuring that the lithium-ion battery has a good cycle life and safety when it is used for long-term fast charging.

Therefore, In an embodiment provided by the present disclosure, by regulating the relationship between Ds and $C_{D50}$ in the positive electrode and $A_{OI}$ in the negative electrode of the lithium-ion battery, the dynamics of the positive and negative electrodes of the lithium-ion battery can achieve optimal matching in the fast charging process, ensure that the lithium-ion battery has a higher charging capacity, while ensuring that the lithium-ion battery has a good cycle life and safety when it is used for long-term fast charging.

In an embodiment, $1.5 < (\ln Ds)^2 / C_{D50} / (A_{OI})^2 < 18.2$.

In an embodiment provided by the present disclosure, when $(\ln Ds)^2 / C_{D50} / (A_{OI})^2$ is greater than 1.5, the migration rate and migration distance of lithium ions in the positive electrode active material match the ability of the negative electrode to accept lithium ions, and the lithium-ion battery can maintain excellent charging capacity in the long-term cycle process, thereby improving the cycle life and safety performance of the battery.

In an embodiment. Ds is in a range from $10^{-10}$ cm$^2$/S to $10^{-13}$ cm$^2$/S.

In an embodiment provided by the present disclosure, if Ds is too small, it is not conducive to the migration of lithium ions in the positive active material, especially at low temperature, the migration rate further decreases, the material dynamics performance is insufficient, and the battery power and low temperature performance become worse. If Ds is too large, on the one hand, it is necessary to increase the proportion of nickel and cobalt precious metals in positive active materials, resulting in increased material design costs and lack of market competitiveness. On the other hand, when Ds is larger, the ion migration rate of positive material is faster, the dynamic performance of positive active material is excellent, and the battery charging ability is better.

In an embodiment, $C_{D50}$ is in a range from 2 μm to 15 μm.

In an embodiment provided by the present disclosure, if $C_{D50}$ is too small, the synthesis cost of the positive material is high and the processing is difficult, and the electrode compacting density is low. However, if $C_{D50}$ is too large, the migration distance of lithium ions in the positive electrode active material will be too long, resulting in a decrease in the power performance of the material and a deterioration charging ability.

In an embodiment, $A_{OI}$ is in a range from 5 to 30.

In an embodiment provided by the present disclosure, if $A_{OI}$ value is too small, which will result in poor machining performance of the negative electrode, a decrease in energy density and an increase in the cost of the negative electrode. When the $A_{OI}$ value is too large, the lithium intercalation capacity of the negative electrode decreases, and the charging process leads to the precipitation of lithium ions on the surface of the negative electrode and the formation of lithium dendrites, resulting in the loss of lithium-ion capacity. In addition, the continuous growth of lithium-ion dendrites consumes too much lithium ions, and the capacity of the long-term fast charge cycle rapidly decays, and the battery cycle life decreases.

In an embodiment, the chemical formula of the positive active material in the positive electrode plate is $Li_aNi_xCo_yM_{1-x-y}O_2$, wherein $0.9 \leq a \leq 1.2$, $x > 0$, $y \geq 0$, $z \geq 0$, and $x+y+z=1$, wherein M comprises any one or a combination of at least two of Mn, Al or W.

In an embodiment, the positive electrode plate comprises a positive active material, a conductive agent and a binder.

In an embodiment provided by the present disclosure, in the negative electrode plate, the conductive agent includes but not limited to acetylene black, ketjen black, carbon nanotubes or graphene, etc. and the binder includes but not limited to styrene butadiene rubber, sodium carboxymethyl cellulose or polyacrylic acid, etc.

In an embodiment, the negative electrode plate comprises a negative active material, a conductive agent and a binder.

In an embodiment provided by the present disclosure, in the negative electrode plate, the conductive agent includes but not limited to acetylene black, ketjen black, carbon nanotubes or graphene, etc. and the binder includes but not limited to styrene butadiene rubber, sodium carboxymethyl cellulose or polyacrylic acid, etc.

In an embodiment provided by the present disclosure, the preparation method of the provided positive and negative electrode plates is not defined, which can be obtained by using a conventional homogenization coating method.

In an embodiment provided by the present disclosure, there is no restriction on the source of the provided separator and electrolyte. Exemplarily, it can be a conventional product used in lithium-ion batteries. For example, it may be a product commonly used in lithium-ion batteries, for example, the separator comprises any one or a combination of at least two of the woven membrane, non-woven fabric, microporous membrane, composite membrane, diaphragm paper or laminated membrane.

In an embodiment, the lithium-ion battery is a lithium-ion power battery.

In an embodiment, the present disclosure provides a preparation method for a lithium-ion battery, comprising:

a positive electrode plate, a separator and a negative electrode plate are prepared into a stacked core through a Z-shaped lamination stacking machine, and then the lithium-ion battery is obtained through a tab welding machine, a soft-pack battery side seal, top seal, liquid injection and pre-sealing.

In an embodiment provided by the present disclosure, the present disclosure also provides a method for preparing a positive electrode plate, comprising:

the positive active material, conductive agent and binder are mixed, the solvent is added, homogenized, coated on the surface of the positive electrode current collector, and the positive electrode plate is obtained after drying and rolling.

In an embodiment provided by the present disclosure, the present disclosure also provides a method for preparing a negative electrode plate, comprising:

the positive active material, conductive agent and binder are mixed, the solvent is added, homogenized, coated on the surface of the positive collector, and the negative electrode plate is obtained after drying and rolling.

Example 1

The present example provides a lithium-ion battery comprising a positive electrode plate, a negative electrode plate, a separator and an electrolyte;

The following values of positive electrode plate and negative electrode plate are shown in table 1: the Ds is the solid-phase diffusion coefficient of lithium ions in the positive electrode plate, D50 is the median particle size of the positive active material in the positive electrode plate, $A_{OI}$ is the OI value of the negative active material in the negative electrode plate and the result of $(\ln Ds)^2/C_{D50}/(A_{OI})^2$.

The positive active material in the positive electrode plate is NCM111, the conductive agent is acetylene black, and the binder is polytetrafluoroethylene.

The negative active material in the negative electrode plate is artificial graphite, the conductive agent is carbon nanotubes, and the binder is styrene butadiene rubber and sodium carboxymethyl cellulose;

The separator is polypropylene membrane and the electrolyte is (1 mol/L $LiPF_6$, EC/EMC/MA).

The preparation method of the lithium-ion battery (comprising positive electrode plate and negative electrode plate) is carried out according to the specific implementation method:

The mass ratio of NCM111, acetylene black and polytetrafluoroethylene in the positive electrode plate is 96:2:2;

The mass ratio of artificial graphite, carbon nanowire, styrene butadiene rubber and sodium carboxymethyl cellulose in the negative electrode plate is 95:2:1:5:1.5.

Example 2

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 3

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 4

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 5

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 6

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 7

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 8

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Example 9

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Comparative Example 1

This example provides a lithium-ion battery, the positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

Comparative Example 2

This example provides a lithium-ion battery, and its positive electrode active material, Ds, $C_{D50}$, $A_{OI}$ and $(\ln Ds)^2/C_{D50}/(A_{OI})^2$ are also shown in Table 1.

All the other preparation methods and parameters are consistent with those of Example 1.

The lithium-ion battery provided by Examples 1-9 and Comparative Examples 1-2 were characterized for dynamic performance, rate capability and cycle performance under the following test conditions:

(1) Dynamic performance test: at 25° C., the lithium-ion batteries prepared by the Examples and Comparative Examples were fully charged at 4 C and fully discharged at 1 C for 10 times, then the lithium-ion batteries were fully charged at 4 C, and then the negative electrode plates were disassembled and the precipitation of lithium on the surface of the negative electrode plate was observed. If the area of lithium precipitation on the negative electrode surface is less than 5%, it is considered mild lithium precipitation; if the area of lithium precipitation on the negative electrode surface is 5-40%, it is considered moderate lithium precipitation; if the area of lithium precipitation on the negative electrode surface is greater than 40%, it is considered severe lithium precipitation.

(2) Cycle performance test: At 25° C., lithium-ion battery prepared by Examples and Comparative Examples were charged at 3 C rate and discharged at 1 C rate, and the full discharge cycle test was carried out until the capacity of lithium-ion batteries decays to 80% of the initial capacity, and the number of cycles was recorded.

The results are shown in Table 1.

charged at a 3 C rate and discharged at a 1 C rate, it will decay to 80% of its initial capacity after at least 2000 cycles.

From the data result of Example 1-3 and Comparative Examples 1-2, it can be seen that $(\ln Ds)^2/C_{D50}/(A_{OI})^2$ is too small or too large, which are not conducive to long-term cycling performance of the battery. If the ratio is too small, the rate of lithium ion deintercalation from the positive material is slow or the capacity of lithium intercalation in the negative material is insufficient, and lithium evolution occurs on the surface of the negative electrode during the fast charging cycle, and the long-term cycle leads to capacity decay. When the ratio is too large, the positive material particle size is generally small, or the negative OI value is low, although it will not lead to negative lithium evolution, but because the positive particle size is small, the negative material cycle performance decreases, and then leads to long-term fast charge cycle decay acceleration.

Conclusion: By regulating the relationship between Ds and $C_{D50}$ in the positive electrode and $A_{OI}$ in the negative electrode of the lithium-ion battery, the present disclosure makes the lithium-ion battery that the dynamics of the positive and negative electrodes can achieve optimal matching in the fast charging process, ensure that the lithium-ion battery has a higher charging capacity, while ensuring that

TABLE 1

| | Positive | | | | Whether lithium is precipitated | |
| | Positive active material | Ds(cm²/S) | $C_{D50}$ (μm) | Negative ($A_{OI}$) | $(\ln Ds)^2/$ $C_{D50}/(A_{OI})^2$ | from the negative electrode | Cycle performance |
|---|---|---|---|---|---|---|---|
| Example 1 | NCM111 | $3 \times 10^{-12}$ | 15 | 8 | 0.73 | Mild lithium precipitation | 1500 cycles |
| Example 2 | NCM111 | $3 \times 10^{-12}$ | 10 | 5 | 2.81 | No lithium precipitation | 3500 cycles |
| Example 3 | NCM111 | $3 \times 10^{-12}$ | 4 | 5 | 7.04 | No lithium precipitation | 2500 cycles |
| Example 4 | NCM622 | $2 \times 10^{-11}$ | 15 | 12 | 0.63 | Moderate lithium precipitation | 1000 cycles |
| Example 5 | NCM622 | $2 \times 10^{-11}$ | 4 | 12 | 1.05 | Mild lithium precipitation | 1500 cycles |
| Example 6 | NCM622 | $2 \times 10^{-11}$ | 15 | 5 | 1.61 | No lithium precipitation | 2000 cycles |
| Example 7 | NCM811 | $2.5 \times 10^{-10}$ | 10 | 8 | 0.62 | Mild lithium precipitation | 1500 cycles |
| Example 8 | NCM811 | $2.5 \times 10^{-10}$ | 18 | 6 | 0.61 | Mild lithium precipitation | 1500 cycles |
| Example 9 | NCM811 | $2.5 \times 10^{-10}$ | 3 | 5 | 5.2 | No lithium precipitation | 3000 cycles |
| Comparative Example 1 | NCM111 | $3 \times 10^{-12}$ | 18 | 10 | 0.39 | Severe lithium precipitation | 1000 cycles |
| Comparative Example 2 | NCM111 | $3 \times 10^{-12}$ | 1 | 5 | 28.16 | No lithium precipitation | 1000 cycles |

From the data results of Examples 1-3, Examples 4-6 and Examples 7-9, it can be seen that, when $(\ln Ds)^2/C_{D50}/(A_{OI})^2$ is greater than 1.5, no matter how the positive active material changes, the performance of the battery can ensure that there is no lithium precipitation after the fast charging cycle. The ability of positive material to remove lithium ions matches the ability of negative material to accept lithium ions, and the battery maintains excellent cycle performance. The lithium-ion battery provided by the disclosure meets $1.5 < (\ln Ds)^2/C_{D50}/(A_{OI})^2 < 18.2$, it can achieve that the negative electrode is fully charged at 4 C and discharged at 1 C for 10 times, and then the lithium-ion battery is fully charged at 4 C without lithium precipitation. When the battery is the lithium-ion battery has a good cycle life and safety when it is used for long-term fast charging.

The invention claimed is:

1. A lithium-ion battery, comprising a positive electrode plate, a negative electrode plate, a separator and an electrolyte;

wherein the positive electrode plate and the negative electrode plate meet the following requirements: $1.5 < (\ln Ds)^2/C_{D50}/(A_{OI})^2 < 18.2$, wherein Ds is the solid-phase diffusion coefficient of the positive active material in the positive electrode plate, $C_{D50}$ is the average particle size of the positive active material in the positive electrode plate, and $A_{OI}$ is the OI value of the negative active material in the negative electrode plate;

wherein the negative active material in the negative electrode plate comprises graphite;

Ds is $3 \times 10^{-12}$ cm$^2$/S, $2 \times 10^{-11}$ cm$^2$/S, or $2.5 \times 10^{-10}$ cm$^2$/S;

D50 is in a range from 2.5 µm to 20 µm;

$A_{OI}$ is 5;

wherein the chemical formula of the positive active material in the positive electrode plate is $Li_aNi_xCo_yM_zO_2$, wherein $0.9 \le a \le 1.2$, $x > 0$, $y \ge 0$, $z \ge 0$, and $x + y + z = 1$, wherein M comprises any one or a combination of at least two of Mn, Al or W.

2. The lithium-ion battery of claim 1, wherein the positive electrode plate comprises a positive active material, a conductive agent and a binder.

3. The lithium-ion battery of claim 1, wherein the negative electrode plate comprises a negative active material, a conductive agent and a binder.

4. The lithium-ion battery of claim 1, wherein the separator comprises any one or a combination of at least two of woven membrane, non-woven fabric, microporous membrane, composite membrane, separator paper or laminated membrane.

5. The lithium-ion battery of claim 1, wherein the lithium-ion battery is a lithium-ion power battery.

\* \* \* \* \*